United States Patent [19]

Himes et al.

[11] 4,039,629
[45] Aug. 2, 1977

[54] BLOCK COPOLYMER BLENDS

[75] Inventors: Glenn R. Himes, Houston, Tex.; Luis Enrique Mendoza, Cerritos, Calif.

[73] Assignee: Shell Oil Company, Houston, Tex.

[21] Appl. No.: 767,932

[22] Filed: Feb. 11, 1977

Related U.S. Application Data

[63] Continuation-in-part of Ser. No. 617,122, Sept. 28, 1975.

[51] Int. Cl.² .............................................. C08L 53/00
[52] U.S. Cl. ............................. 260/876 B; 260/880 B
[58] Field of Search .................................... 260/876 B

[56] References Cited

U.S. PATENT DOCUMENTS

| | | | |
|---|---|---|---|
| 3,497,572 | 2/1970 | Childers | 260/876 B |
| 3,519,585 | 7/1970 | Miller | 260/27 |
| 3,607,977 | 9/1971 | Taylor | 260/876 B |
| 3,614,836 | 10/1971 | Snyder | 36/1.5 |
| 3,646,161 | 2/1972 | Marwede | 260/876 B |
| 3,823,203 | 7/1974 | La Mare | 260/876 B |
| 3,865,776 | 2/1975 | Gergen | 260/33.6 AQ |
| 3,932,327 | 1/1976 | Naylor | 260/27 BB |
| 4,006,116 | 2/1977 | Dominguez | 260/876 B |

Primary Examiner—Paul Lieberman
Attorney, Agent, or Firm—Dean F. Vance

[57] ABSTRACT

Block copolymer blends exhibiting improved (reduced) delamination characteristics comprise 65-90 parts of certain block copolymers having an average total molecular weight of 130,000 - 250,000 with a monoalkenyl arene block mol. wt. of 20,000 - 30,000 blended with 35-10 parts of a second block polymer having an average total molecular weight between about 60,000 and 100,000 with a monoalkenyl arene block mol. wt. between about 5,000 and 15,000.

8 Claims, No Drawings

BLOCK COPOLYMER BLENDS

The present application is a continuation-in-part of application Ser. No. 617,122, filed September 28, 1975, now abandoned.

BACKGROUND OF THE INVENTION

Block copolymers are known which comprise polymer blocks of monoalkenyl arenes such as styrene with polymer blocks of conjugated dienes such as butadiene or isoprene. They may be linear copolymers or non-linear copolymers referred to as star, cruciform or branched polymers. Normally, they are formed in solution by the use of the so-called living polymer technology, particularly involving lithium-based catalysts such as lithium alkyls. They are used for numerous purposes, especially where there is an economic advantage for omitting a vulcanizing step since, when properly selected, these block copolymers exhibit the properties of a vulcanized rubber without having been chemically vulcanized. At elevated temperatures, they exhibit the property of thermoplastic polymers and therefore can be processed in equipment normally employed in the processing of thermoplastics such as alpha olefins, polystyrene or PVC. The equipment may involve injection molding equipment or forming apparatus such as extruders. A case in point is the use of these materials for the formation of footwear or footwear components.

The block polymers can be compounded with such materials as plasticizers, extenders, fillers, supplementary polymers and stabilizers to provide compounded products having a desired set of physical properties for an intended end use.

In the footwear area, one of the peculiar properties of major importance is impact resistance since this is directly related to the functioning of the material for such purposes as heels or toplifts. Due to the relatively small area of a heel, especially on women's shoes, the heel is momentarily subjected to surprisingly high impact. If the material making up the heel is not suitable for this purpose, this may be reflected in either a jarring impact in the wearers' foot and leg, or if the component is too pliable, it may result in a compound which eventually tends to spread beyond the intended dimensions of the shoe component part.

It has been found that certain block copolymers when compounded as referred to above, may form suitable injection molding compounds but exhibit important disadvantages in one respect or another when they are subject to forming operations of a different type such as extrusion or calendering. The most evident of such shortcomings can be referred to as "delamination". By this is meant the tendency of a heel or toplift, during wear, to separate in layer or fibrous strips oriented in the direction of extrusion. This undesirable effect leads to excessive heel wear, and has been observed regardless of the other suitable properties of the compound.

It is an object of the present invention to provide improved block copolymer compositions. It is a particular object of the invention to provide such compositions exhibiting reduced delamination tendencies. It is a special object of the invention to provide an extrusion molding compound showing reduced delamination and especially useful for the formation of footwear components such as heel stock.

Now, in accord with the present invention, a blend achieving these objectives is provided comprising (per 100 parts total of the two essential components):

a. 65-90 parts by weight of a first block copolymer having an average total molecular weight between about 130,000 and 250,000 and a bound monoalkenyl arene block mol. wt. between about 20,000 and 30,000;

b. 35-10 parts by weight of a second block copolymer having an average total molecular weight between about 60,000 and 100,000 and a bound monoalkenyl arene block mol. wt. between about 5,000 and 15,000; both of said block copolymers having at least two monoalkenyl arene polymer blocks and at least one conjugated diene polymer block.

It has been found that compounds having this basic blend exhibit little if any delamination when extruded even though other block copolymers having about the same average molecular weight and compounding ingredients show considerable delamination.

The present invention is not predicated alone upon blend of two dissimilar block copolymers. On the contrary, it relies in addition upon the critical selection of these two polymers to achieve the desired end result in contrast to other blends known in the block polymer art. For example, U.S. Pat. No. 3,646,161 shows certain block copolymer blends usable for the formation of hard molded articles but requiring vulcanization, which is not required here.

The present invention is usable for formation of a wide variety of end-use products although it is related especially to and described here in terms of extruded footwear component stock.

Both of the essential block copolymers are of the general type and prepared by the general methods referred to earlier. Consequently, they may be either linear or branched but must each have at least two monoalkenyl arene polymer blocks and at least one conjugated diene polymer block per molecule. The first block copolymer has a total molecular weight determined by intrinsic viscosity and infrared analysis of 130,000 to 250,000, preferably 170,000–210,000. This first copolymer also should have a bound monoalkenyl arene block mol. wt. between about 20,000 and 30,000, preferably 23,000–27,000. The first block copolymer also normally has an intrinsic viscosity in toluene at 30° C between about 1.3 and 2.3 dl/g.

The second block copolymer which is present in amounts between 35 and 10 parts (preferably 25-15) by weight for each 100 parts by weight of the total block copolymer has an average total molecular weight between about 60,000 and 100,000, preferably 70,000 and 90,000; a monoalkenyl arene block mol. wt. between about 5,000 and 15,000, preferably 8,000–12,000; an an intrinsic viscosity at 30° C in toluene between about 0.8 and about 1.2 dl/g. If the proportion of the second block copolymer is increased beyond the range of the above, extrusion compounds prepared therefrom exhibit the same type of delamination. If the proportion of the second block copolymer is decreased below the range of the above, extrusion compounds prepared therefrom exhibit excessively high impact set properties and excessive spread when worn as a heel or toplift. The presence of the first block copolymer having the relatively higher molecular weight promotes the physical properties of the resulting compounds desirable particularly in footwear components. These and other associated properties are enhanced by modifying the polymer blends with other compounding ingredients.

The monoalkenyl arenes which may be utilized in forming the subject block copolymers include especially styrene, alpha methyl styrene, tert butyl styrene and their mixtures. The conjugated dienes which may be used include butadiene and isoprene as well as mixtures thereof.

These block copolymers may be either branched or linear species. Moreover, mixtures of these two types may be employed if desired.

In a preferred embodiment, both of the block copolymers have not been hydrogenated, and possess unsaturated midblocks.

The blends may be modified with such supplementary thermoplastic polymers as polystyrene, poly (alphamethylstyrene), poly (alpha olefins) such as polyethylene or polypropylene and copolymers of ethylene with vinyl acetate. The extenders or plasticizers which may be used include mineral oil rubber extenders which preferably are relatively low in aromatic hydrocarbon content. Well-known fillers, pigments, coloring agents and stabilizers also may be utilized. A preferred extrudable composition showing essentially no delaminating cases includes the following components:

| | | |
|---|---|---|
| (a) | A first block copolymer of styrene and butadiene having an average total molecular weight between 170,000 and 210,000 and a styrene block mol. wt. of 23,000–27,000; | 75–85 |
| (b) | A second block copolymer of styrene and butadiene having an average total molecular weight between 70,000 and 90,000 and a styrene block mol. wt. of 8,000–12,000; | 15–25 |
| (c) | Polystyrene | 75–125 |
| (d) | Naphthenic oil extender | 15–35 |
| (e) | Antioxidants | 0.5–1.5 |

These extrudable non-delaminating compounds may be assembled by well-known procedures including Banbury mixing or dry blending. Since the block copolymers are normally synthesized in solution, they may be blended while still in solution after which the solvent may be removed such as by flashing. This results in a crumb or particle which may be blended with the other components such as plasticizers, polymers, or fillers in a blending operation which may comprise extrusion mixing or dry blending. In the latter instance, it is preferred that all of the components be reduced to particle sizes found to be suitable for a dry blending procedure, the dry particulate mix so formed then being sent to the extruder for the formation of the desired shape, such as slab or sheet from which the shoe component or other article may be cut.

The following examples illustrate the advantages gained by use of the compounds of the present invention compared with a similar compound in which only a single block copolymer was present.

The prior art compound had the following composition:

| | Parts by Weight |
|---|---|
| Polystyrene - Polybutadiene - Polystyrene (33% styrene) 16,000–65,000–16,000 block mol. wt. | 100 |
| Naphthenic Oil | 32 |
| Crystal Polystyrene | 115 |
| Alpha Methyl Styrene Resin | 10 |
| Calcium Carbonate Filler | 15 |
| Antioxidant | 1 |

This composition, which forms suitable heel stock when injection molded, showed unacceptable delamination when extruded and worn on shoes as a toplift. For example, ten shoes so equipped were wear tested and all ten showed delamination.

The following composition of the present invention was tested in comparison with this prior art compound.

| | Parts by Weight |
|---|---|
| Polystyrene - Polybutadiene - Polystyrene (30% Styrene) 25,000–117,000–25,000 | 80 |
| Polystyrene - Polybutadiene - Polystyrene (27% Styrene) 10,000–57,000–10,000 | 20 |
| Naphthenic Oil | 25 |
| Crystal Polystyrene | 97 |
| Antioxidant | 1 |

Upon extrusion of this composition, no delamination was experienced. In a wear test comparison with the prior art compound above, ten shoes equipped with toplifts having the new composition showed no delamination.

The following table compares the other properties obtained on these two compounds.

| PHYSICAL PROPERTIES OF EXTRUDED HEEL COMPOSITIONS | | |
|---|---|---|
| Properties | This Invention[1] | Prior Art |
| Melt Flow, Condition G, (before extrusion), g/10 min. | 3.7 | 28 |
| Hardness, Shore D[2] | 41 | 39 |
| Specific Gravity[3] | 0.985 | 1.028 |
| Abrasion Index, NES, % | 193 | 179 |
| Taber Abrasion, cc loss/1000 rev. | 0.40 | 0.44 |
| Coefficient of friction[4], 50 in/min slip rate | 0.65 | 0.68 |
| Impact Set[5], mils | 4.2 | 3.2 |

[1] Extruded in a 3½ inch NRM extruder.
[2] Hand held durometer, 10 second reading; ASTM D-2240.
[3] Measured in salt solutions of graded specific gravities.
[4] On dry vinyl floor. Heel sanded on a 50 grit sand paper.
[5] Measured by dropping 500 times, a 45-pound steel beam onto a 9 iron thick hee specimen from a height of 1 inch and determining the decrease in thickness. Sample was 1 inch in diameter cut from extruded sheet.

We claim as our invention:

1. An unvulcanized block copolymer composition suitable for the manufacture of shoe heels comprising:
   a. 65 to 90 parts by weight of a first block copolymer having an average total molecular weight between about 170,000 and 210,000 and a monoalkenyl arene block mol. wt. between about 20,000 and 30,000; and
   b. 35 to 10 parts by weight of a second block copolymer having an average total molecular weight between about 70,000 and 90,000 and a monoalkenyl arene block mol. wt. between about 5,000 and 15,000; both of said block copolymers having at least two monoalkenyl arene polymer blocks and at least one conjugated diene polymer block and both of said block copolymers not having been hydrogenated.

2. A composition according to claim 1 wherein the first block copolymer is present in an amount between about 75 and 85 parts by weight.

3. A composition according to claim 1 wherein the second block copolymer is present in an amount between about 25 to 15 parts by weight.

4. A composition according to claim 1 wherein the first block copolymer has a styrene block mol. wt. between about 23,000 and 27,000.

5. A composition according to claim 1 wherein the second block copolymer has a styrene block mol. wt. between about 8,000 and 12,000.

6. A composition according to claim 1 comprising in addition 25-150 parts by weight, per 100 parts of block copolymers, of a thermoplastic polymer of the group consisting of polystyrene, poly (alphamethylstyrene), poly (alpha olefins) and copolymers of ethylene with vinyl acetate.

7. A composition according to claim 1 comprising in addition 10-50 parts by weight per 100 parts of block copolymers, of an extending oil.

8. An extrudable composition according to claim 1 comprising

| | | Parts by weight |
|---|---|---|
| a) | a first block copolymer of styrene and butadiene having an average total molecular weight between 170,000 and 210,000 and a styrene block mol. wt. of 23,000-27,000; | 75-85 |
| b) | a second block copolymer of styrene and butadiene having an average total molecular weight between 70,000 and 90,000 and a styrene block mol. wt. of 8,000-12,000; | 15-25 |
| c) | Polystyrene | 75-125 |
| d) | Naphthenic oil extender | 15-35 |
| e) | Antioxidant | 0.5-1.5 |

* * * * *